(12) United States Patent
Zhang

(10) Patent No.: US 9,411,344 B2
(45) Date of Patent: Aug. 9, 2016

(54) ENERGY SAVING MONITORING METHOD AND DEVICE

(71) Applicant: Huawei Technologies Co., Ltd., Shenzhen (CN)

(72) Inventor: Nanjun Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 410 days.

(21) Appl. No.: 14/140,787

(22) Filed: Dec. 26, 2013

(65) Prior Publication Data

US 2014/0107855 A1   Apr. 17, 2014

Related U.S. Application Data

(63) Continuation of application No. PCT/CN2011/084888, filed on Dec. 29, 2011.

(51) Int. Cl.
*G06F 9/455* (2006.01)
*G06F 1/00* (2006.01)
(Continued)

(52) U.S. Cl.
CPC ............... *G05D 23/19* (2013.01); *G05B 15/02* (2013.01); *G06F 1/3206* (2013.01);
(Continued)

(58) Field of Classification Search
CPC .... G05D 23/19; H04L 12/12; H04L 12/2823; Y02B 60/34; G06F 1/3209; G06F 1/3246; G06F 1/3206; G06F 9/3206; G06F 9/5094; G05B 15/02
USPC ...................... 718/1; 713/324, 300
See application file for complete search history.

(56) References Cited

U.S. PATENT DOCUMENTS

2007/0180117 A1   8/2007  Matsumoto et al.
2008/0104587 A1   5/2008  Magenheimer et al.
(Continued)

FOREIGN PATENT DOCUMENTS

| | | |
|---|---|---|
| CN | 102096461 A | 6/2011 |
| CN | 102193525 A | 9/2011 |
| WO | 2011043317 A1 | 4/2011 |

OTHER PUBLICATIONS

Foreign Communication From a Counterpart Application, PCT Application No. PCT/CN2011/084888, International Search Report dated Sep. 13, 2012, 7 pages.
(Continued)

*Primary Examiner* — Camquy Truong
(74) *Attorney, Agent, or Firm* — Conley Rose, P.C.; Grant Rodolph

(57) ABSTRACT

An energy saving monitoring method and device are provided. The method includes: acquiring system resource occupation information of an information technology (IT) device layer management system; sending a power-off instruction to the IT device layer management system according to the system resource occupation information, so that the IT device layer management system closes a virtual machine in a no-load state; and receiving a power-off feedback message sent by the IT device layer management system, and sending a refrigeration adjustment instruction to an infrastructure layer monitoring system according to a running state of a corresponding virtual machine in a refrigeration area where the closed virtual machine is located, so that the infrastructure layer monitoring system adjusts refrigeration deployment of the refrigeration area where the closed virtual machine is located.

22 Claims, 7 Drawing Sheets

(51) Int. Cl.
  *G05D 23/19* (2006.01)
  *H04L 12/28* (2006.01)
  *H04L 12/12* (2006.01)
  *G06F 1/32* (2006.01)
  *G05B 15/02* (2006.01)
  *G06F 9/50* (2006.01)

(52) U.S. Cl.
  CPC ........... *G06F 1/3209* (2013.01); *G06F 1/3246* (2013.01); *G06F 9/5094* (2013.01); *H04L 12/12* (2013.01); *H04L 12/2823* (2013.01); *H04L 12/2827* (2013.01); *Y02B 60/142* (2013.01); *Y02B 60/32* (2013.01); *Y02B 60/34* (2013.01)

(56) References Cited

U.S. PATENT DOCUMENTS

| | | |
|---|---|---|
| 2010/0211810 A1 | 8/2010 | Zacho |
| 2011/0145816 A1* | 6/2011 | Glikson .............. G06F 9/45558 718/1 |
| 2012/0204051 A1 | 8/2012 | Murakami et al. |

OTHER PUBLICATIONS

Foreign Communication From a Counterpart Application, PCT Application No. PCT/CN2011/084888, Written Opinion dated Sep. 13, 2012, 8 pages.

Foreign Communication From a Counterpart Application, European Application No. 11878330.7, Extended European Search Report dated Jun. 23, 2014, 8 pages.

\* cited by examiner

ENERGY SAVING MONITORING METHOD AND DEVICE

CROSS-REFERENCE TO RELATED APPLICATIONS

This application is a continuation of International Application No. PCT/CN2011/084888, filed on Dec. 29, 2011, which is hereby incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

Embodiments of the present invention relate to the cloud network device monitoring field, and in particular, to an energy saving monitoring method and device.

BACKGROUND OF THE INVENTION

Cloud computing refers to a service delivery and use mode in which desired services are acquired through a network according to requirements in an extensible manner. Such services may be information technology (IT) related services, software related services, Internet related services, or other services. The core idea of the cloud computing is to implement unified management and scheduling for numerous computing resources connected by a network, thereby forming a computing resource pool to provide users with services on demand (that is, services provided according to requirements of users).

A network that provides resources is called a "cloud". As seen from a user, the resources in the "cloud" can be extended without limit, and can be acquired anytime, extended anytime, and used according to requirements in a pay-per-use manner. At present, the cloud computing uses a virtualization technology to virtualize solid-state server devices, network devices, and storage devices into virtual computing resources, virtual network resources, and virtual machine storage resources. These virtual resources may be collectively called virtual machines (e.g. virtual resource computers).

A cloud computing data center may be divided into three layers: an infrastructure layer (Level1), an IT device layer (Level2), and a service and application layer (Level3). The infrastructure layer may include a power supply device, a cabinet device, a refrigeration device, a heat dissipation device, a fire control device, a security protection device, a maintenance device, and so on, which are monitored by an infrastructure layer monitoring system in a unified manner. The IT device layer may include a server device, a network device, a security device, and a storage device, which are managed by an IT device layer management system in a unified manner. The service and application layer includes a wide range of services or applications, such as electronic mail (E-mail), office software, and multimedia applications that are directly oriented to users.

Because the cloud computing relates to a wide range of services and applications, the cloud computing data center has a heavy pressure of service loads. To process these service loads, many virtual machines are configured at the IT device layer of the cloud computing data center. In addition, to ensure the normal operation and running efficiency of these virtual machines, corresponding refrigeration devices are equipped at the infrastructure layer for these virtual machines in the cloud computing data center. However, these refrigeration devices generate huge electric energy consumption. As the energy price rises, electric energy consumption causes great cost pressure to the cloud computing data center. As far as the refrigeration devices are concerned, electric energy consumed by the refrigeration devices is already equal to or more than electric energy consumed in the operating of the virtual machines. Therefore, how to effectively increase the power usage effectiveness (PUE) of the data center while ensuring that the devices in the cloud computing data center work normally becomes a critical issue.

In the prior art, the IT device layer and the infrastructure layer both have an independent control system. No message interaction mechanism is available between the IT device layer management system and the infrastructure layer monitoring system, that is, the infrastructure layer cannot learn service changes of the IT device layer. When a service at the IT device layer is closed, a virtual machine at the IT device layer is powered off, but in this case, a refrigeration device at the infrastructure layer still works as usual, resulting in a great waste of refrigeration power consumption and increase of the operating cost of the cloud computing data center.

SUMMARY OF THE INVENTION

Embodiments of the present invention provide an energy saving monitoring method and device, which are used to perform refrigeration adjustment for virtual machines at an IT device layer.

An energy saving monitoring method, comprising: acquiring system resource occupation information of an IT device layer management system; sending a power-off instruction to the IT device layer management system according to the system resource occupation information, so that the IT device layer management system closes a virtual machine in a no-load state; and receiving a power-off feedback message sent by the IT device layer management system, and sending a refrigeration adjustment instruction to an infrastructure layer monitoring system according to a running state of a corresponding virtual machine in a refrigeration area where the closed virtual machine is located, so that the infrastructure layer monitoring system adjusts refrigeration deployment of the refrigeration area where the closed virtual machine is located.

An energy saving monitoring apparatus, comprising: an acquiring unit configured to acquire system resource occupation information of an information technology IT device layer management system; a power-off instruction unit configured to send a power-off instruction to the IT device layer management system according to the system resource occupation information, so that the IT device layer management system closes a virtual machine in a no-load state; a feedback receiving unit configured to receive a power-off feedback message sent by the IT device layer management system; and a refrigeration adjustment unit configured to send a refrigeration adjustment instruction to an infrastructure layer monitoring system according to a running state of a corresponding virtual machine in a refrigeration area where the closed virtual machine is located, so that the infrastructure layer monitoring system adjusts refrigeration deployment of the refrigeration area where the closed virtual machine is located.

An information technology device layer management system provided by the present invention includes: an information providing unit configured to provide an energy saving monitoring apparatus with system resource occupation information of the IT device layer management system; a power-off instruction receiving unit configured to receive a power-off instruction sent according to the system resource occupation information by the energy saving monitoring apparatus; a closing unit configured to close a virtual machine in a no-load state according to the power-off instruction; and a feedback unit configured to send a power-off feedback message to the energy saving monitoring apparatus, so that the energy saving monitoring apparatus sends a refrigeration adjustment instruction to an infrastructure layer monitoring system according to a running state of a corresponding virtual machine in a refrigeration area where the closed virtual machine is located.

As can be seen from the above technical solutions, the embodiments of the present invention have the following advantages:

In the embodiments of the present invention, by querying system resource occupation information of an IT device layer management system, an energy saving monitoring apparatus can learn a running state of each virtual machine, and therefore determine whether refrigeration adjustment needs to be performed; when the refrigeration adjustment needs to be performed, can send a power-off instruction to the IT device layer management system, so that the IT device layer management system closes a virtual machine in a no-load state, and therefore, can cause, according to a running state of a corresponding virtual machine in a refrigeration area where the closed virtual machine is located, an infrastructure layer monitoring system to perform the refrigeration adjustment (reduce a refrigeration effect in a light-load area or close a refrigeration device in a no-load area), so that the resource configuration is optimized.

DETAILED DESCRIPTION OF THE EMBODIMENTS

Figure 1:
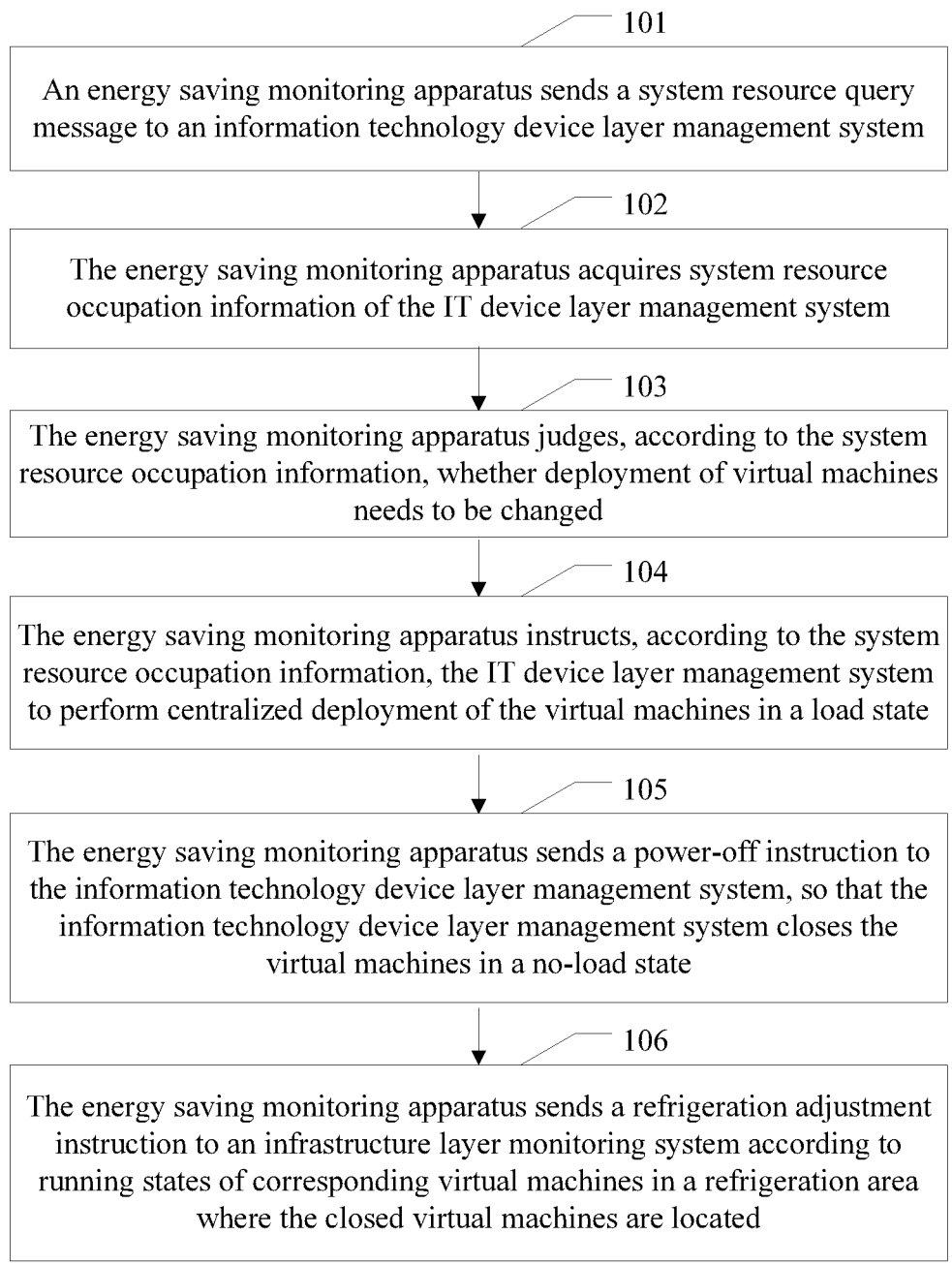
FIG. 1 is a schematic diagram of an embodiment of an energy saving monitoring method according to the present invention.

Embodiments of the present invention provide an energy saving monitoring method and device, which are used to properly perform refrigeration adjustment for virtual machines at an IT device layer.

An embodiment of the present invention provides an energy saving monitoring method, including:

acquiring system resource occupation information of an IT device layer management system; sending a power-off instruction to the IT device layer management system according to the system resource occupation information, so that the IT device layer management system closes a virtual machine in a no-load state; and receiving a power-off feedback message sent by the IT device layer management system, and sending a refrigeration adjustment instruction to an infrastructure layer monitoring system according to a running state of a corresponding virtual machine in a refrigeration area where the closed virtual machine is located, so that the infrastructure layer monitoring system adjusts refrigeration deployment of the refrigeration area where the closed virtual machine is located.

The refrigeration area is an area where a refrigeration device refrigerates several virtual machines stored in a space. Specifically, a refrigeration area may be an area where a cabinet (a cabinet may store multiple virtual machines) is located, and a refrigeration area may be an area in a room. The range of a refrigeration area may be divided according to an actual situation, and is not limited herein.

The method in the embodiment of the present invention may be implemented by an energy saving monitoring apparatus. In actual applications, the energy saving monitoring apparatus may be a Portal functional entity located between an IT device layer management system and an infrastructure layer monitoring system, and may also be a unified monitoring system of a three-layer structure (an infrastructure layer, an IT device layer, and a service and application layer) in a cloud computing data center. The Portal functional entity or unified monitoring system may establish connections with the IT device layer management system and infrastructure layer monitoring system respectively through a Simple Object Access Protocol (SOAP), and respectively implement message exchange between the Portal functional entity, the IT device layer management system, and the infrastructure layer monitoring system by using a communication mechanism of "request, response, and result".

In the embodiment of the present invention, an energy saving monitoring apparatus can learn a running state of each virtual machine by learning system resource occupation information of an IT device layer management system, and therefore determine to close a virtual machine in a no-load state; and under the instruction of the energy saving monitoring apparatus, the virtual machine in the no-load state is closed, and therefore, an infrastructure layer monitoring system can perform refrigeration adjustment according to a running state of a corresponding virtual machine in a refrigeration area where the closed virtual machine is located, so that the resource configuration is optimized.

Referring to FIG. 1, an embodiment of the present invention provides an energy saving monitoring method, including:

101. An energy saving monitoring apparatus sends a system resource query message to an information technology device layer management system.

The energy saving monitoring apparatus sends the system resource query message to the IT device layer management system to query system resource occupation information of the IT device layer management system.

102. The energy saving monitoring apparatus acquires system resource occupation information of the IT device layer management system.

The energy saving monitoring apparatus receives the system resource occupation information returned by the information technology device layer management system.

In this embodiment, the system resource query message is used in step 101. Optionally, the energy saving monitoring apparatus may actively acquire the system resource occupation information. In other embodiments, step 101 may be skipped, and the IT device layer management system may also actively send, for example, periodically pushes, the system resource occupation information to the energy saving monitoring apparatus. The energy saving monitoring apparatus may directly acquire the system resource occupation information that is actively pushed by the IT device layer management system.

Optionally, the system resource occupation information may be usage information and the like of a current operating system, process, thread, and application program of each virtual machine in the IT device layer management system. The energy saving monitoring apparatus analyzes the information to acquire central processing unit (CPU) occupation information and/or memory occupation information of each virtual machine in the IT device layer management system.

Alternatively, the system resource occupation information may also be CPU occupation information and/or memory occupation information of each virtual machine; after the IT device layer management system receives the system resource query message, the IT device layer management system performs an internal query about usage information and the like of a current operating system, process, thread, and application program of each virtual machine operating locally, thereby acquiring the CPU occupation information and/or memory occupation information of each virtual machine, and feeds back the CPU occupation information and/or memory occupation information to the energy saving monitoring apparatus through the system resource occupation information.

In the prior art, the IT device layer management system may manage virtual machines at an IT device layer in a unified manner, and monitor a running state of each virtual machine in real time, and instruct the virtual machines to perform various operations (for example, a hot migration operation and a power-off operation).

103. The energy saving monitoring apparatus determines, according to the system resource occupation information, whether deployment of virtual machines needs to be changed.

The energy saving monitoring apparatus determines, according to the system resource occupation information, whether the deployment of the virtual machines needs to be changed, and if yes, triggers step 104 of instructing the IT device layer management system to perform centralized deployment of virtual machines in a load state, or if not, keeps a state of each virtual machine in the IT device layer management system unchanged and terminates the procedure.

Specifically, after receiving the system resource occupation information, the energy saving monitoring apparatus may determine the running state of each virtual machine in the IT device layer management system according to the system resource occupation information, and when a ratio of the number of virtual machines in a no-load state to the number of the virtual machines in the load state meets a preset condition, determine that the deployment of the virtual machines needs to be changed. The load state may further include a light-load state and a heavy-load state. When considering whether hot migration needs to be performed, the energy saving monitoring apparatus may further consider the ratio of numbers of virtual machines in the no-load state, the light-load state, and the heavy-load state. A specific reference condition for determining whether the deployment of the virtual machines needs to be changed may be determined according to actual requirements, and is not limited herein.

Whether the virtual machines are in the light-load state or heavy-load state may be determined by setting a preset load threshold, for example, virtual machines whose loads are higher than or equal to 50% are in the heavy-load state, and virtual machines whose loads are lower than 50% are in the light-load state.

In actual applications, the traffic of the IT device layer in different periods of time varies; if a part of the virtual machines are caused to be in the no-load state due to light traffic in a period of time but the virtual machines in the no-load state are distributed in disorder, it is impossible to adjust refrigeration deployment of refrigeration devices even if the running state of each virtual machine is learned, because so long as there is a device still running in a refrigeration area, to ensure normal running of the device, a refrigeration device in the refrigeration area cannot be closed. Therefore, it is required that deployment of virtual machines should be changed. Changing the deployment of the virtual machines includes changing deployment of the virtual machines in the load state to centralized deployment.

104. The energy saving monitoring apparatus instructs, according to the system resource occupation information, the IT device layer management system to perform centralized deployment of the virtual machines in a load state.

Optionally, after determining that the deployment of the virtual machines needs to be changed, the energy saving monitoring apparatus may determine, according to the system resource occupation information, virtual machines requiring migration, and further, may determine a centralized deployment policy (this policy is used to implement the centralized deployment of the virtual machines in the load state) according to the virtual machines requiring migration, so that the energy saving monitoring apparatus instructs, according to the centralized deployment policy, the IT device layer management system to perform the centralized deployment of the virtual machines in the load state. Multiple centralized deployment policies may be available for implementing the centralized deployment of the virtual machines. This will be described in detail in subsequent embodiments, and is not limited herein.

105. The energy saving monitoring apparatus notifies the information technology device layer management system of sending a power-off instruction, so that the information technology device layer management system closes virtual machines in a no-load state.

After determining that the centralized deployment of the virtual machines in the load state is completed, the energy saving monitoring apparatus sends the power-off instruction to the information technology device layer management system, so that the IT device layer management system closes the virtual machines in the no-load state.

By receiving a power-off feedback message sent by the IT device layer management system, the energy saving monitoring apparatus may determine that the power-off of the virtual machines in the no-load state is completed.

106. The energy saving monitoring apparatus sends a refrigeration adjustment instruction to an infrastructure layer monitoring system according to running states of corresponding virtual machines in a refrigeration area where the closed virtual machines are located.

After determining that the virtual machines in the no-load states are closed, the energy saving monitoring apparatus sends the refrigeration adjustment instruction to the infrastructure layer monitoring system according to the running states of the corresponding virtual machines in the refrigeration area where the closed virtual machines are located, so that the infrastructure layer monitoring system adjusts refrigeration deployment of the area where the closed virtual machines are located, thereby optimizing refrigeration output.

Optionally, the refrigeration adjustment instruction may include a refrigeration adjustment policy. The refrigeration adjustment instruction may be a first refrigeration adjustment instruction causing the infrastructure layer monitoring system to close a refrigeration device in a no-load area, and may also be a second refrigeration adjustment instruction causing the infrastructure layer monitoring system to reduce a refrigeration effect in a light-load area, and may also include deployment information of the virtual machines after the change. The refrigeration adjustment policy is decided by the infrastructure layer monitoring system according to the deployment information.

Specifically, the refrigeration adjustment policy may include: closing a refrigeration device in a no-load area, where the no-load area is an area where all virtual machines are in the power-off state within a refrigeration area; and/or, reducing a refrigeration effect in a light-load area, where the light-load area is a refrigeration area where the number of virtual machines in the load state is smaller than a preset number within the refrigeration area.

In the embodiment of the present invention, one refrigeration device is equipped in one refrigeration area, where the refrigeration device may operate independently or be closed. In actual operations, a refrigeration area is a cabinet, and multiple virtual machines and one refrigeration device may be configured in one cabinet.

In the prior art, the infrastructure layer monitoring system may monitor and manage refrigeration devices at an infrastructure layer in a unified manner.

In the embodiment of the present invention, by querying system resource occupation information of an IT device layer management system, a running state of each virtual machine can be learned, and therefore, whether refrigeration adjustment needs to be performed is determined; when the refrigeration adjustment needs to be performed, the IT device layer management system can be instructed to perform centralized deployment of virtual machines in a load state, and therefore, an infrastructure layer monitoring system can be caused to perform the refrigeration adjustment, so that the resource configuration is optimized.

Figure 2:
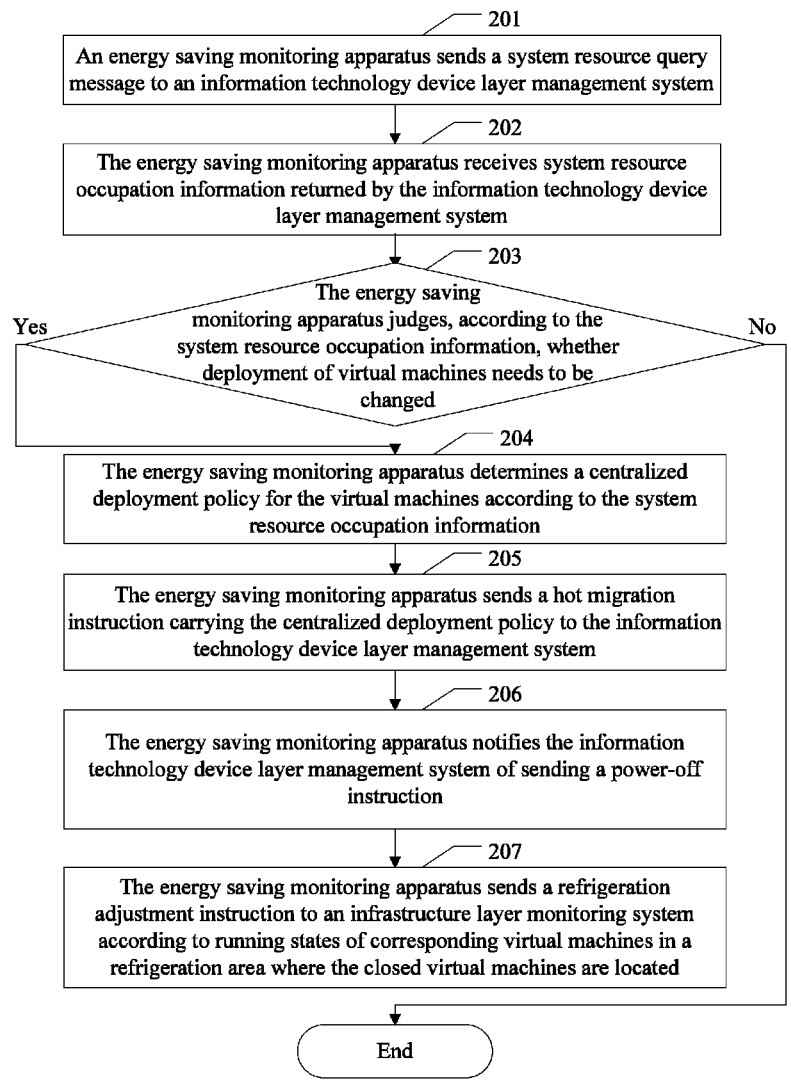
FIG. 2 is a schematic diagram of another embodiment of an energy saving monitoring method according to the present invention.

The following describes in detail how to implement centralized deployment of virtual machines in a load state. Referring to FIG. 2, another embodiment of the energy saving monitoring method in the embodiments of the present invention includes the following:

201. An energy saving monitoring apparatus sends a system resource query message to an information technology device layer management system.

Content of step 201 in this embodiment is the same as content of step 101 in the embodiment shown in FIG. 1, and is not further described herein.

202. The energy saving monitoring apparatus receives system resource occupation information returned by the information technology device layer management system.

The energy saving monitoring apparatus receives the system resource occupation information returned by the IT device layer management system, where the system resource occupation information carries CPU occupation information and/or memory occupation information of virtual machines in the IT device layer management system.

Specifically, after the IT device layer management system receives the system resource query message, the IT device layer management system performs an internal query about usage information and the like of a current operating system, process, thread, and application program of each virtual machine operating locally, thereby acquiring the CPU occupation information and/or memory occupation information of each virtual machine, and feeds back the CPU occupation information and/or memory occupation information to the energy saving monitoring apparatus through the system resource occupation information.

203. The energy saving monitoring apparatus determines, according to the system resource occupation information, whether deployment of virtual machines needs to be changed.

The energy saving monitoring apparatus determines, according to the CPU occupation information and/or memory occupation information in the system resource occupation information, whether the deployment of the virtual machines needs to be changed, and if yes, triggers step 204 of determining a centralized deployment policy for the virtual machines, or if not, keeps a state of each virtual machine in the IT device layer management system unchanged and terminates the procedure.

Specifically, the energy saving monitoring apparatus may determine, according to the CPU occupation information and/or memory occupation information, the number of virtual machines in a no-load state and the number of virtual machines in a load state, respectively.

Optionally, the energy saving monitoring apparatus may determine whether the CPU occupation information and/or memory occupation information of the virtual machines meets a preset no-load condition, and if yes, determine that the virtual machines are in the no-load state; for example, if a difference between current CPU and memory occupation information of the virtual machines and CPU and memory occupation information in idle time is lower than 1% and lasts for 60 seconds, the energy saving monitoring apparatus determines that the virtual machines are in the no-load state. Alternatively, to further ensure accuracy of determining, the energy saving monitoring apparatus may perform determination again; for example, if a difference between current CPU and memory occupation information of the virtual machines and CPU and memory occupation information in idle time is lower than 1% and lasts for 60 seconds, the energy saving monitoring apparatus preliminarily determines that the virtual machines are in the no-load state, and after 5 minutes, redetects the CPU occupation information and/or memory occupation information of the virtual machines that are preliminarily determined as in the no-load state, and if the difference between the current CPU and memory occupation information of the virtual machines and the CPU and memory occupation information in idle time is lower than 1%, determines that the virtual machines are in the no-load state.

Likewise, the energy saving monitoring apparatus may determine whether the CPU occupation information and/or memory occupation information of the virtual machines meets a preset load condition, and if yes, determine that the virtual machines are in the load state; for example, if a difference between current CPU and memory occupation information of the virtual machines and CPU and memory occupation information in idle time is higher than 1% and lasts for 20 seconds, the energy saving monitoring apparatus determines that the virtual machines are in the load state. Similar to determining in the case of no loads, to further ensure accuracy of determining, the virtual machines that are preliminarily determined as in the load state may also be determined again.

After respectively determining the running state of each virtual machine at an IT device layer, the energy saving monitoring apparatus respectively counts the number of the virtual machines in the no-load state and the number of the virtual machines in the load state, determines a ratio of the number of the virtual machines in the no-load state to the number of the virtual machines in the load state, and determines whether the ratio meets a preset condition, for example, whether the ratio of the number of the virtual machines in the no-load state reaches 30%, and if yes, determines that the deployment of the virtual machines needs to be changed. Optionally, in actual applications, the preset condition may also be set to other conditions, for example, reference factors, such as the temperature of an area where the virtual machines are located and the period of time thereof, and may be determined according to an actual situation, and is not limited herein.

204. The energy saving monitoring apparatus determines a centralized deployment policy for the virtual machines according to the system resource occupation information.

After determining that the deployment of the virtual machines needs to be changed, the energy saving monitoring apparatus may determine, according to the system resource occupation information, virtual machines requiring centralized deployment (the centralized deployment includes centralized deployment of the virtual machines in the load state, where the virtual machines in the load state include virtual machines in the light-load state and virtual machines in the heavy-load state, for example, if the number of virtual machines in the load state in an area is smaller than a preset number or the virtual machines in the area are in the light-load state, it is determined that the virtual machines in the area require centralized deployment); and further, may determine the centralized deployment policy according to the virtual machines requiring centralized deployment.

In this embodiment, the centralized deployment of the virtual machines may be implemented by hot migration of the virtual machines. Hot migration of a virtual machine means that a running state of a whole virtual machine is completely stored and can be quickly restored on another virtual machine of an original hardware platform or a virtual machine of a different hardware platform; in addition, in the restoration process, the virtual machine can implement smooth service migration without interruption, so that a user does not perceive any difference. Specifically, the centralized deployment policy may include a migrated object (that is, a virtual machine requiring hot migration) and a migration rule. The migration rule in the centralized deployment policy may be: most preferentially hot-migrating a server device to an area close to a management device; next, hot-migrating the server device to an area close to a storage device; and still next, hot-migrating the server device to an area close to a network device.

In actual applications, the virtual machines include a server device, a management device, a network device, and a storage device. Because the management device, the network device, and the storage device cannot be powered off, during hot migration, a virtual machine of a server device type is preferentially hot-migrated to the vicinity of a virtual machine that cannot be powered off as far as possible, so that a refrigeration system at an infrastructure layer performs centralized power supply and refrigeration in an area where the virtual machine that cannot be powered off is located.

Optionally, the energy saving monitoring apparatus may determine a migrated object according to a current running state of each virtual machine, and acquire, by calculation according to a preset algorithm and the above migration rule, a path for hot migration of the migrated object, thereby acquiring the specific centralized deployment policy. Optionally, after determining the migrated object, the energy saving monitoring apparatus may also calculate the degree of matching between the current running state of each virtual machine and preset several migration scenarios (each migration scenario is configured with a corresponding centralized deployment policy), thereby selecting one of preset several centralized deployment policies as a policy for performing hot migration currently. The manner of acquiring the centralized deployment policy may be determined according to an actual situation, and is not limited herein.

205. The energy saving monitoring apparatus sends a hot migration instruction carrying the centralized deployment policy to the information technology device layer management system.

The energy saving monitoring apparatus sends the hot migration instruction carrying the centralized deployment policy to the information technology device layer management system, so that the IT device layer management system hot-migrates the virtual machines according to the centralized deployment policy, thereby implementing the centralized deployment of the virtual machines in the load state.

After performing the centralized deployment, the energy saving monitoring apparatus needs to return to steps 201 and 202 to acquire system resource occupation information after the IT device layer management system performs the centralized deployment.

206. The energy saving monitoring apparatus notifies, according to system resource occupation information after the IT device layer management system performs the centralized deployment, the information technology device layer management system of sending a power-off instruction, so that the information technology device layer management system closes virtual machines in a no-load state.

Content of step 206 in this embodiment is the same as content of step 106 in the embodiment shown in FIG. 1, and is not further described herein.

207. The energy saving monitoring apparatus sends a refrigeration adjustment instruction to an infrastructure layer monitoring system according to running states of corresponding virtual machines in a refrigeration area where the closed virtual machines are located.

Content of step 207 in this embodiment is the same as content of step 106 in the embodiment shown in FIG. 1, and is not further described herein.

Figure 3:
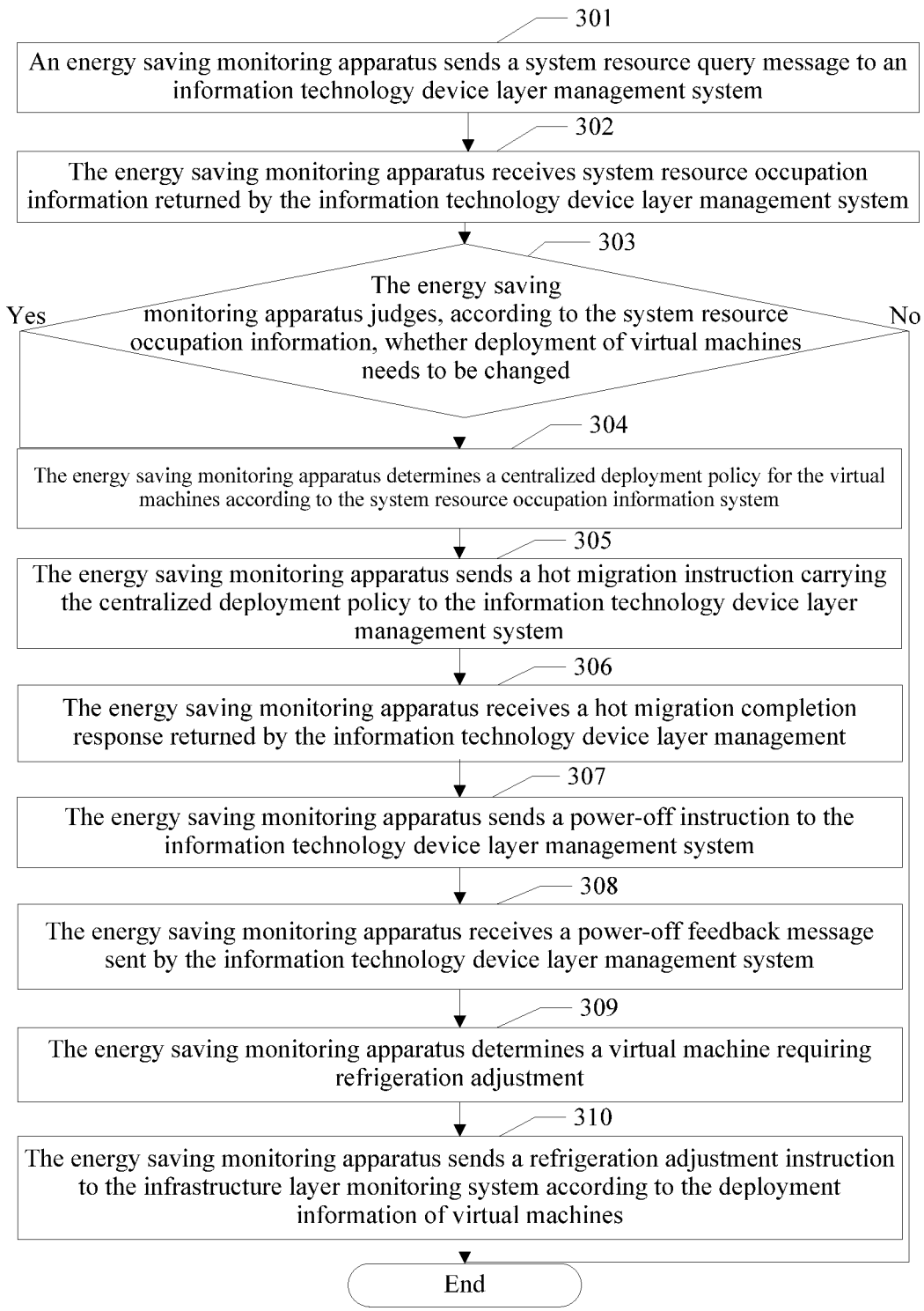
FIG. 3 is a schematic diagram of another embodiment of an energy saving monitoring method according to the present invention.

In actual applications, after the centralized deployment of the virtual machines is completed, because a few virtual machines in the load state still exist in some areas, the energy saving monitoring apparatus needs to instruct, according to the actual deployment information, the infrastructure layer monitoring system to perform refrigeration adjustment. Referring to FIG. 3, another embodiment of the energy saving monitoring method in the embodiments of the present invention includes the following:

301. An energy saving monitoring apparatus sends a system resource query message to an information technology device layer management system.

Content of step 301 in this embodiment is the same as content of step 101 in the embodiment shown in FIG. 1, and is not further described herein.

302. The energy saving monitoring apparatus receives system resource occupation information returned by the information technology device layer management system.

Content of step 302 in this embodiment is the same as content of step 202 in the embodiment shown in FIG. 2, and is not further described herein.

303. The energy saving monitoring apparatus determines, according to the system resource occupation information, whether deployment of virtual machines needs to be changed.

The energy saving monitoring apparatus determines, according to CPU occupation information and/or memory occupation information in the system resource occupation information, whether the deployment of the virtual machines needs to be changed, and if yes, triggers step 304 of determining a centralized deployment policy for the virtual machines, or if not, keeps a state of each virtual machine in the IT device layer management system unchanged and terminates the procedure.

304. The energy saving monitoring apparatus determines a centralized deployment policy for the virtual machines according to the system resource occupation information.

After determining that the deployment of the virtual machines needs to be changed, the energy saving monitoring apparatus may determine, according to the system resource occupation information, virtual machines requiring hot migration; and further, may determine the centralized deployment policy according to the virtual machines requiring hot migration.

Specifically, the centralized deployment policy may include a migrated object and a migration rule. The migration rule in the centralized deployment policy may be: most preferentially hot-migrating a server device to an area close to a management device; next, hot-migrating the server device to an area close to a storage device; and still next, hot-migrating the server device to an area close to a network device.

305. The energy saving monitoring apparatus sends a hot migration instruction carrying the centralized deployment policy to the information technology device layer management system.

The energy saving monitoring apparatus sends the hot migration instruction carrying the centralized deployment policy to the information technology device layer management system, so that the IT device layer management system hot-migrates the virtual machines according to the centralized deployment policy, thereby implementing centralized deployment of virtual machines in a load state.

306. The energy saving monitoring apparatus receives a hot migration completion response returned by the information technology device layer management system.

In actual applications, the IT device layer management system may return the hot migration completion response to the energy saving monitoring apparatus after completing hot migration of the virtual machines. After receiving the hot migration completion response, the energy saving monitoring apparatus may determine that the hot migration of the virtual machines is completed, and may immediately trigger step 307 of closing virtual machines in a no-load state.

After performing the centralized deployment, the energy saving monitoring apparatus needs to return to steps 301 and 302 to acquire system resource occupation information after the IT device layer management system performs the centralized deployment.

307. The energy saving monitoring apparatus sends a power-off instruction to the information technology device layer management system.

After determining that the hot migration of the virtual machines is completed, the energy saving monitoring apparatus sends the power-off instruction to the information technology device layer management system according to the system resource occupation information after the IT device layer management system performs the centralized deployment, so that the IT device layer management system closes the virtual machines in the no-load state.

308. The energy saving monitoring apparatus receives a power-off feedback message sent by the information technology device layer management system.

In actual applications, the IT device layer management system may send the power-off feedback message to the energy saving monitoring apparatus after completing the power-off operation of the virtual machines in the no-load state; after receiving the power-off feedback message, the energy saving monitoring apparatus may learn, according to the power-off feedback message, the specific information of performing the power-off instruction by the virtual machines (for example, all virtual machines in the no-load state are powered off).

The power-off feedback message carries a cabinet number. The cabinet number is a number of a cabinet where a virtual machine that is powered off is located.

309. The energy saving monitoring apparatus determines a virtual machine requiring refrigeration adjustment.

The energy saving monitoring apparatus detects whether the cabinet number matches an identifier of the virtual machine in the cabinet corresponding to the cabinet number, and if yes, triggers step 310 of sending a refrigeration adjustment instruction to an infrastructure layer monitoring system, or if not, sends a query message to the IT device layer management system, so that the IT device layer management system re-determines a matching relationship between the cabinet number and the virtual machine in the cabinet.

In actual applications, the virtual machine is placed in a cabinet at an IT device layer. Multiple virtual machines may be placed in one cabinet, and the IT device layer management system records a matching relationship between identifiers of virtual machines and a number of the cabinet (for example, which virtual machines are stored in one cabinet, where all the virtual machines can be uniquely identified by the identifiers of the virtual machines, and the matching relationship is correspondence between the cabinet number and the identifier of each virtual machine stored in the cabinet). Because hot migration of virtual machines occurs, to ensure that the relationship between the cabinet and the virtual machines placed in the cabinet are not in disorder, the energy saving monitoring apparatus needs to check the matching relationship between the cabinet number and the identifiers of the corresponding virtual machines (that is, check whether there is an identifier of a no-load virtual machine to be powered off among the identifiers of the virtual machines corresponding to the cabinet number, and if yes, determine correctness), and after determining correctness, may send the refrigeration adjustment instruction to the infrastructure layer monitoring system.

310. The energy saving monitoring apparatus sends a refrigeration adjustment instruction to the infrastructure layer monitoring system according to the deployment information of virtual machines.

The sending, by the energy saving monitoring apparatus, a refrigeration adjustment instruction to the infrastructure layer monitoring system according to the deployment information of virtual machines specifically is:

if an area where the closed virtual machines are located is a no-load area, sending a first refrigeration adjustment instruction to the infrastructure layer monitoring system, so that the infrastructure layer monitoring system closes a refrigeration device in the no-load area, where the no-load area is an area where all virtual machines are in a power-off state; or if an area where the closed virtual machines are located is a light-load area, sending a second refrigeration adjustment instruction to the infrastructure layer monitoring system, so that the infrastructure layer monitoring system reduces a refrigeration effect in the light-load area, where the light-load area is an area where the number of virtual machines in a load state is smaller than a preset number (the preset number may be determined according to an actual situation and is not limited herein). Because a virtual machine still runs in the light-load area, the refrigeration device in the area cannot be closed; in addition, because hot migration occurs in the area, and the number of virtual machines in the load state is small, the refrigeration effect of the area can be reduced.

Figure 4:
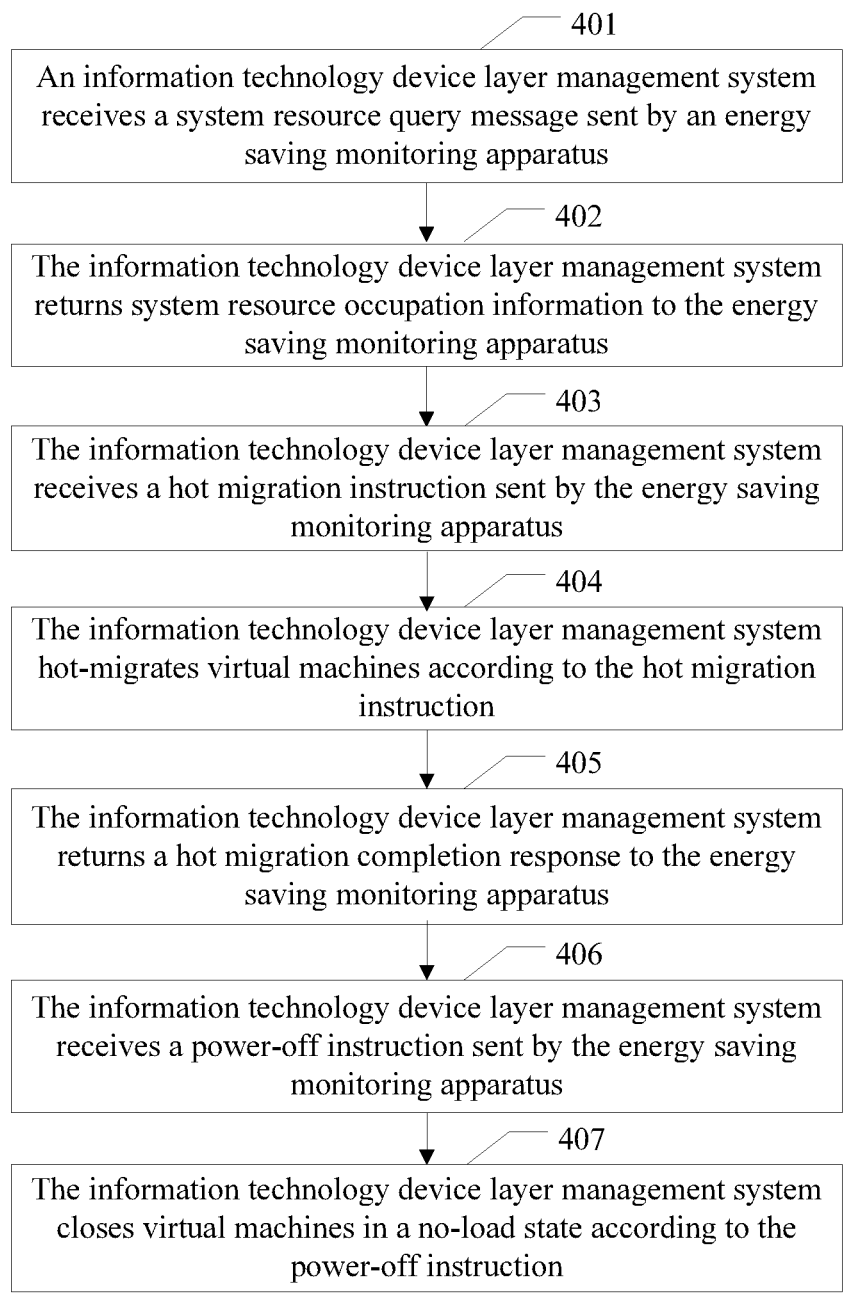
FIG. 4 is a schematic diagram of another embodiment of an energy saving monitoring method according to the present invention.

The following describes the energy saving monitoring method in the embodiment of the present invention from the perspective of an IT device layer management system. Referring to FIG. 4, another embodiment of the energy saving monitoring method in the embodiments of the present invention includes the following:

401. An information technology device layer management system receives a system resource query message sent by an energy saving monitoring apparatus.

The IT device layer management system queries system resource occupation information of the IT device layer management system according to the system resource query message after receiving the system resource query message sent by the energy saving monitoring apparatus.

402. The information technology device layer management system returns system resource occupation information to the energy saving monitoring apparatus.

The IT device layer management system returns the system resource occupation information to the energy saving monitoring apparatus.

Specifically, the system resource occupation information may include: CPU occupation information and/or memory occupation information of each virtual machine in the IT device layer management system. The IT device layer management system may perform an internal query about usage information and the like of a current operating system, process, thread, and application program of each virtual machine operating locally, thereby acquiring the CPU occupation information and/or memory occupation information of each virtual machine. The IT device layer management system may return the CPU occupation information and/or memory occupation information to the energy saving monitoring apparatus.

Optionally, the system resource occupation information may also be: usage information and the like of a current operating system, process, thread, and application program of each virtual machine; the IT device layer management system directly returns the usage information and the like of the current operating system, process, thread, and application program of each virtual machine to the energy saving monitoring apparatus, so that the energy saving monitoring apparatus acquires the CPU occupation information and/or memory occupation information from the above information.

Optionally, the IT device layer management system may actively send the system resource occupation information to the energy saving monitoring apparatus at an interval of a preset duration. Therefore, the above step 401 may be skipped in the case of active sending.

403. The information technology device layer management system receives a hot migration instruction sent by the energy saving monitoring apparatus.

The IT device layer management system receives the hot migration instruction sent by the energy saving monitoring apparatus, where the hot migration instruction may include a centralized deployment policy, so that the IT device layer management system is instructed to perform centralized deployment.

404. The information technology device layer management system hot-migrates virtual machines according to the hot migration instruction.

The IT device layer management system hot-migrates the virtual machines in the IT device layer management system according to the hot migration instruction, thereby implementing centralized deployment of virtual machines in a load state.

Hot migration of a virtual machine means that a running state of a whole virtual machine is completely stored and can be quickly restored on another virtual machine of an original hardware platform or a virtual machine of a different hardware platform; in addition, in the restoration process, the virtual machine can implement smooth service migration without interruption, so that a user does not perceive any difference.

Specifically, the manner of the centralized deployment of the virtual machines is decided by the centralized deployment policy, where many types of hot migration rules may be used to implement the centralized deployment of the virtual machines. The centralized deployment policy may include a migrated object (that is, a virtual machine requiring hot migration) and a migration rule. The migration rule in the centralized deployment policy may be: most preferentially hot-migrating a server device to an area close to a management device; next, hot-migrating the server device to an area close to a storage device; and still next, hot-migrating the server device to an area close to a network device.

In actual applications, the virtual machines include a server device, a management device, a network device, and a storage device. Because the management device, the network device, and the storage device cannot be powered off, during hot migration, a virtual machine of a server device type is preferentially hot-migrated to the vicinity of a virtual machine that cannot be powered off as far as possible, so that a refrigeration system at an infrastructure layer performs centralized power supply and refrigeration in an area where the virtual machine that cannot be powered off is located.

Optionally, the energy saving monitoring apparatus may determine a migrated object according to a current running state of each virtual machine, and acquire, by calculation according to a preset algorithm and the above migration rule, a path for hot migration of the migrated object, thereby acquiring the specific centralized deployment policy. Optionally, after determining the migrated object, the energy saving monitoring apparatus may also calculate the degree of matching between the current running state of each virtual machine and preset several migration scenarios (each migration scenario is configured with a corresponding centralized deployment policy), thereby selecting one of preset several centralized deployment policies as a policy for performing hot migration currently. The manner of acquiring the centralized deployment policy may be determined according to an actual situation, and is not limited herein.

405. The information technology device layer management system returns a hot migration completion response to the energy saving monitoring apparatus.

Optionally, after determining that the hot migration is completed, the IT device layer management system returns the hot migration completion response to the energy saving monitoring apparatus, so that the energy saving monitoring apparatus can perform a further operation (for example, instruct a virtual machine in a no-load state to power off).

406. The information technology device layer management system receives a power-off instruction sent by the energy saving monitoring apparatus.

The IT device layer management system receives the power-off instruction sent by the energy saving monitoring apparatus, where the power-off instruction is used to instruct the IT device layer management system to close the virtual machines in the no-load state.

Specifically, after receiving the hot migration completion response, the energy saving monitoring apparatus may determine that the hot migration of the virtual machines is completed, subsequently acquire system resource occupation information after the IT device layer management system performs the centralized deployment, and send the power-off instruction to the IT device layer management system according to the system resource occupation information.

407. The information technology device layer management system closes virtual machines in a no-load state according to the power-off instruction.

The IT device layer management system closes the virtual machines in the no-load state according to the power-off instruction, sends a power-off feedback message to the energy saving monitoring apparatus, and feeds back specific information of performing the power-off instruction by the virtual machines (for example, all virtual machines in the no-load state are powered off). Therefore, according to the power-off feedback message, the energy saving monitoring apparatus sends a refrigeration adjustment instruction to an infrastructure layer monitoring system to adjust refrigeration deployment.

For ease of understanding, the following uses a specific application scenario to describe in detail the energy saving monitoring method described in the above embodiment, which specifically is:

It is assumed that a cloud computing data center includes 1000 virtual machines, including server devices, network devices, security devices, and storage devices. There are 50 virtual machines that cannot be powered off, such as network devices, security devices, and storage devices, and they are respectively deployed in three cabinets, that is, A1, A2, and A3 (an English character represents a row, and a numeric character represents a column, for example, A2 represents a cabinet in row A and column 2). The virtual machines are identified as A1S01-A1S20, A2S01-A2S20, and A3S01-A3S10 (S01-S20 represent identifiers of virtual machines, for example, S05 represents a virtual machine numbered 5). The other 950 virtual machines are respectively deployed in cabinets, such as A3-A5, B1-B5, C1-C5, D1-D5, and E1-E5; other infrastructure layer devices are all deployed in cabinets F1-F5 and G1-G5. 20 virtual machines may be deployed in each cabinet.

In actual applications, a period of time for triggering an energy saving monitoring procedure may be set. For example, 08:00-22:00 in a day is a period of time with heavy traffic, and the energy saving monitoring procedure may be not performed; while 24:00-06:00 in a day is a period of time with light traffic, and the energy saving monitoring procedure may be performed.

Assuming that a Portal (an energy saving monitoring apparatus) starts to query and analyze system resource occupation information from 22:30, if virtual machines whose CPU usage is 30%-100% or memory usage is 20%-100% account for more than 30% of virtual machines in the whole data center, the state of each virtual machine in the IT device layer management system remains unchanged, and the query and analysis of the system resource occupation information are continued.

If virtual machines whose CPU usage is 30%-100% or memory usage is 20%-100% account for less than 30% of virtual machines in the whole data center, a correspondence table between usage and identifiers of virtual machines may be obtained by counting according to the CPU usage and/or memory usage, for example, A1S06, load 58%, and E5S20, load 20%.

Then, the Portal may determine a hot migration policy for the virtual machines according to the correspondence table, for example, most preferentially migrate virtual machines whose CPU usage and memory usage are lower than 30% to idle resources in cabinets A1-A3, find, by using the identifiers of virtual machines before migration, Internet Protocol (IP) addresses of virtual machines to which the virtual machines will be migrated, and perform point-to-point hot migration based on the IP addresses. Then, the Portal completes hot migration of all virtual machines in an incremental manner according to the usage 40%, 60%, 80%, and 100%.

When it is found, during the process of the hot migration of the virtual machines, that server resources in A1-A3 are not enough to undertake the hot migration of the virtual machines, server resources in A3-A5 are used; if resources are still not enough, server device resources in B1-B5 and C1-C5 are used. Because it is calculated previously that the load of the whole data center is lower than 30%, server resources in A1-A5, B1-B5, and C1-C5 are completely enough to undertake the load, and there will be no request for migration of the virtual machines subsequently.

After the hot migration of the virtual machines is completed, the power-off operation of the virtual machines is performed. A sensor feeds back information about temperatures in cabinets, such as A1-A5, B1-B5, C1-C5, D1-D5, and E1-E5 and areas nearby, and the infrastructure layer monitoring system feeds back the information to the Portal. According to the temperatures, the Portal determines numbers of cabinets that meet a power-off condition, and after finding correspondence between cabinet numbers and refrigeration devices in a database, the Portal delivers numbers of refrigeration devices that can be powered off or lowers the temperature to the infrastructure layer monitoring system. The infrastructure layer monitoring system performs a power-off or cooling operation, and feeds back operation log information (including a message name, operation time, and a state of an operation result) to the Portal.

After long-term running, the load distribution in the data center is summarized. Therefore, virtual machines are always stable and undertake more than 30% of service loads are all deployed in cabinets A1-A5, B1-B5, and C1-C5 in a centralized manner for centralized cooling. Virtual machines that have long-term flexible requirements are deployed in other cabinets, and the energy saving and emission reduction work is regularly performed locally and is not needed globally.

The above describes the application scenario in the embodiment of the present invention only by using some examples. It can be understood that, in actual applications, there may be more application scenarios, which are not limited herein.

In the above description, a third-party device (the energy saving monitoring apparatus) performs the energy saving monitoring method in the embodiment of the present invention. Except the above method, the energy saving monitoring method in the embodiment of the present invention may be further performed by an IT device layer management system. Specifically, referring to FIG. 5, another embodiment of the energy saving monitoring method in the embodiments of the present invention includes the following:

501. An information technology device layer management system acquires system resource occupation information of virtual machines.

The IT device layer management system acquires the system resource occupation information of the virtual machines. Specifically, the system resource occupation information may be: CPU occupation information and/or memory occupation information of each virtual machine; the IT device layer management system may acquire the CPU occupation information and/or memory occupation information of each virtual machine by querying and analyzing the usage information and the like of a current operating system, process, thread, and application program of each virtual machine operating locally.

502. The information technology device layer management system determines, according to the system resource occupation information, whether deployment of the virtual machines needs to be changed.

The IT device layer management system determines, according to the system resource occupation information, whether the deployment of the virtual machines needs to be changed, and if yes, triggers step 503 of sending a hot migration instruction to virtual machines that require hot migration, so that the virtual machines in the load state are deployed in a centralized manner, or if not, keeps a state of each virtual machine in the IT device layer management system unchanged, and terminates the procedure.

Specifically, after acquiring the system resource occupation information, the IT device layer management system may determine a running state of each virtual machine in the IT device layer management system according to the system resource occupation information, and when a ratio of the number of virtual machines in a no-load state to the number of virtual machines in a load state meets a preset condition, determine that the deployment of the virtual machines needs to be changed. The load state may further include a light-load state and a heavy-load state. When considering whether hot migration needs to be performed, the IT device layer management system may further consider the ratio of numbers of virtual machines in the no-load state, the light-load state, and the heavy-load state. A specific reference condition for determining whether the hot migration needs to be performed may be determined according to actual requirements, and is not limited herein.

Whether the virtual machines are in the light-load state or heavy-load state may be determined by setting a preset load threshold, for example, virtual machines whose loads are higher than or equal to 50% are in the heavy-load state, and virtual machines whose loads are lower than 50% are in the light-load state.

In actual applications, the traffic of an IT device layer in different periods of time varies; if a part of the virtual machines are caused to be in the no-load state due to light traffic in a period of time but the virtual machines in the no-load state are distributed in disorder, it is impossible to adjust refrigeration deployment of refrigeration devices even if the running state of each virtual machine is learned, because so long as there is a device still running in a refrigeration area, to ensure normal running of the device, a refrigeration device in the refrigeration area cannot be closed. Therefore, it is required that deployment of virtual machines should be changed.

503. The information technology device layer management system sends a hot migration message to virtual machines requiring hot migration.

After determining that the hot migration of the virtual machines needs to be performed, the IT device layer management system determines a centralized deployment policy according to the CPU occupation information and/or memory occupation information of each virtual machine. Then the IT device layer management system sends, according to the centralized deployment policy, the hot migration message to the virtual machines requiring hot migration, so that the virtual machines in the load state are deployed in a centralized manner.

504. The information technology device layer management system sends a power-off instruction to virtual machines in a no-load state.

After determining that the hot migration of the virtual machines is completed, the IT device layer management system sends the power-off instruction to the virtual machines in the no-load state according to the system resource occupation information after centralized deployment, and closes the virtual machines in the no-load state.

505. The information technology device layer management system sends a refrigeration adjustment instruction to an infrastructure layer monitoring system.

After determining that the virtual machines in the no-load state are powered off, the IT device layer management system sends the refrigeration adjustment instruction to the infrastructure layer monitoring system according to the distribution of the virtual machines that execute the power-off instruction.

Therefore, the infrastructure layer monitoring system adjusts refrigeration devices at an infrastructure layer according to the deployment of the virtual machines after the hot migration, thereby optimizing refrigeration output.

Optionally, the refrigeration adjustment instruction may include a refrigeration adjustment policy. The refrigeration adjustment instruction may also include deployment information of the virtual machines after the hot migration. The refrigeration adjustment policy is decided by the infrastructure layer monitoring system according to the deployment information.

Specifically, the refrigeration adjustment policy may include: closing a refrigeration device in a no-load area, where the no-load area is an area where all virtual machines are in the power-off state; and/or, reducing a refrigeration effect in a light-load area, where the light-load area is an area where the number of virtual machines in the load state is smaller than a preset number.

Figure 6:
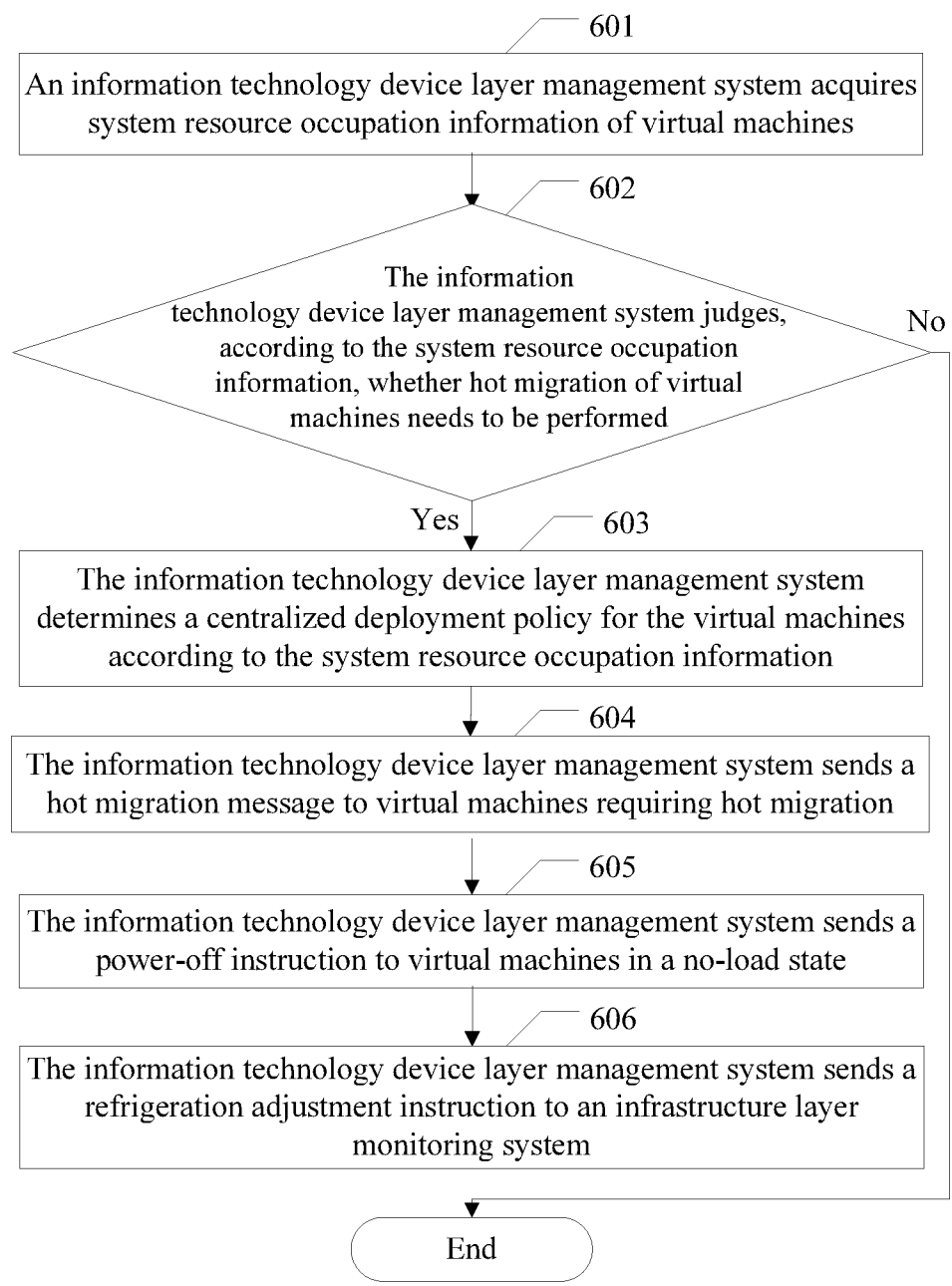
FIG. 6 is a schematic diagram of another embodiment of an energy saving monitoring method according to the present invention.

The following describes in detail an energy saving monitoring method performed by an IT device layer management system. Referring to FIG. 6, another embodiment of the energy saving monitoring method in the embodiments of the present invention includes the following:

601. An information technology device layer management system acquires system resource occupation information of virtual machines.

Figure 5:
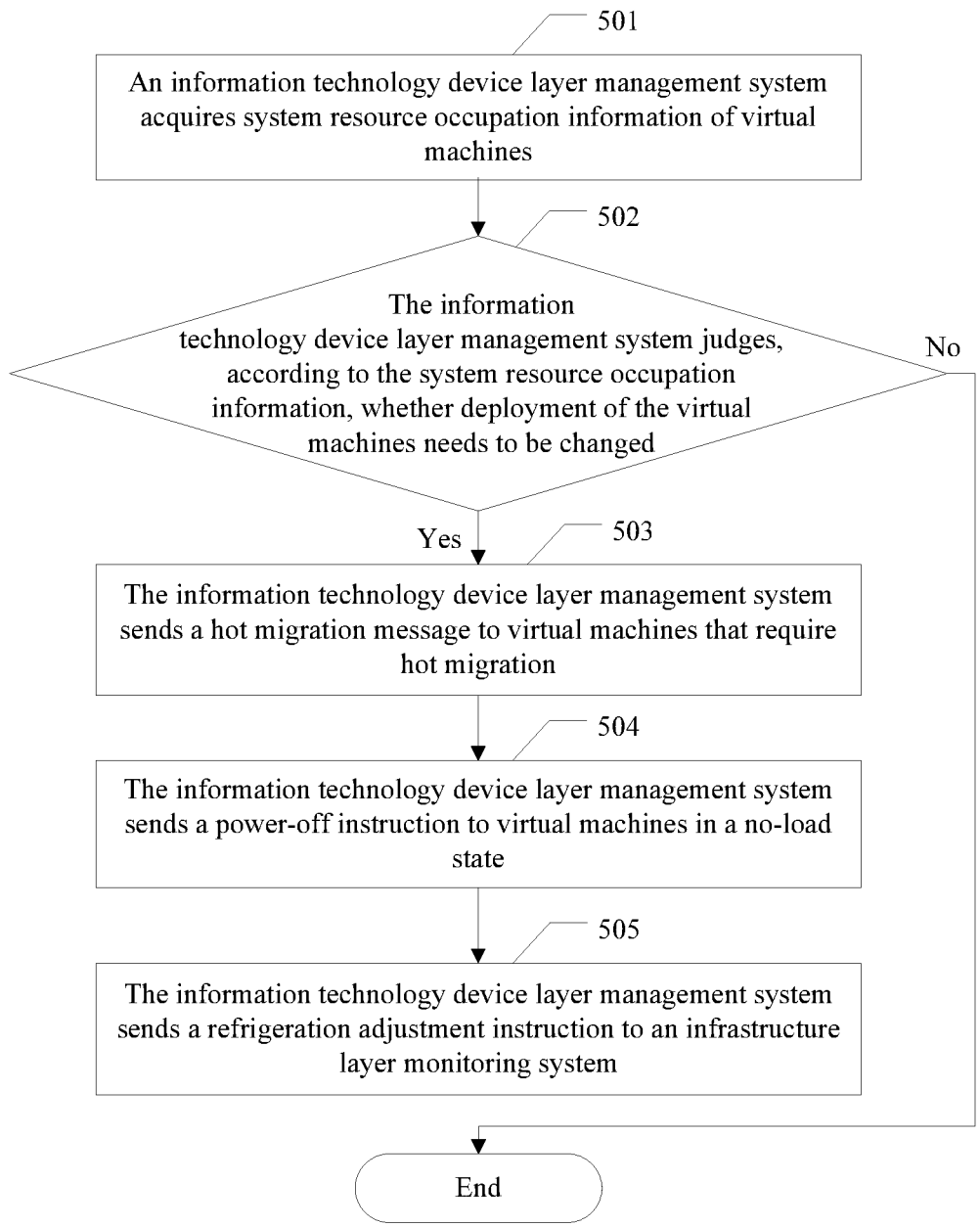
FIG. 5 is a schematic diagram of another embodiment of an energy saving monitoring method according to the present invention.

Content of step 601 in this embodiment is the same as content of step 501 in the embodiment shown in FIG. 5, and is not further described herein.

602. The information technology device layer management system determines, according to the system resource occupation information, whether hot migration of virtual machines needs to be performed.

The IT device layer management system determines, according to CPU occupation information and/or memory occupation information in the system resource occupation information, whether the hot migration of the virtual machines needs to be performed, and if yes, triggers step 604 of sending a hot migration message to virtual machines requiring hot migration, or if not, keeps a state of each virtual machine in the IT device layer management system unchanged, and terminates the procedure.

Specifically, the IT device layer management system may determine, according to the CPU occupation information and/or memory occupation information, the number of virtual machines in a no-load state and the number of virtual machines in a load state, respectively.

Optionally, the energy saving monitoring apparatus may determine whether the CPU occupation information and/or memory occupation information of the virtual machines meets a preset no-load condition, and if yes, determine that the virtual machines are in the no-load state; for example, if a difference between current CPU and memory occupation information of the virtual machines and CPU and memory occupation information in idle time is lower than 1% and lasts for 60 seconds, the energy saving monitoring apparatus determines that the virtual machines are in the no-load state. Alternatively, to further ensure accuracy of determining, the energy saving monitoring apparatus may perform determination again; for example, if a difference between current CPU and memory occupation information of the virtual machines and CPU and memory occupation information in idle time is lower than 1% and lasts for 60 seconds, the energy saving monitoring apparatus preliminarily determines that the virtual machines are in the no-load state, and after 5 minutes, redetects the CPU occupation information and/or memory occupation information of the virtual machines that are preliminarily determined as in the no-load state, and if the difference between the current CPU and memory occupation information of the virtual machines and the CPU and memory occupation information in idle time is lower than 1%, determines that the virtual machines are in the no-load state.

Likewise, the energy saving monitoring apparatus may determine whether the CPU occupation information and/or memory occupation information of the virtual machines meets a preset load condition, and if yes, determine that the virtual machines are in the load state; for example, if a difference between current CPU and memory occupation information of the virtual machines and CPU and memory occupation information in idle time is higher than 1% and lasts for 20 seconds, the energy saving monitoring apparatus determines that the virtual machines are in the load state. Similar to determining in the case of no loads, to further ensure accuracy of determining, the virtual machines that are preliminarily determined as in the load state may also be determined again.

After respectively determining the running state of each virtual machine at an IT device layer, the energy saving monitoring apparatus respectively counts the number of the virtual machines in the no-load state and the number of the virtual machines in the load state, determines a ratio of the number of the virtual machines in the no-load state to the number of the virtual machines in the load state, and determines whether the ratio meets a preset condition, for example, whether the ratio of the number of the virtual machines in the no-load state reaches 30%, and if yes, determines that the deployment of the virtual machines needs to be changed. Optionally, in actual applications, the preset condition may also be set to other conditions, for example, reference factors, such as the temperature of an area where the virtual machines are located and the period of time thereof, and may be determined according to an actual situation, and is not limited herein.

603. The information technology device layer management system determines a centralized deployment policy for the virtual machines according to the system resource occupation information.

After determining that the hot migration of the virtual machines needs to be performed, the IT device layer management system may determine, according to the system resource occupation information, the virtual machines requiring hot migration, and further, may determine the centralized deployment policy according to the virtual machines requiring hot migration.

Specifically, the centralized deployment policy may include a migrated object (that is, a virtual machine requiring hot migration) and a migration rule. The migration rule in the centralized deployment policy may be: most preferentially hot-migrating a server device to an area close to a management device; next, hot-migrating the server device to an area close to a storage device; and still next, hot-migrating the server device to an area close to a network device.

In actual applications, the virtual machines include a server device, a management device, a network device, and a storage device. Because the management device, the network device, and the storage device cannot be powered off, during hot migration, a virtual machine of a server device type is preferentially hot-migrated to the vicinity of a virtual machine that cannot be powered off as far as possible, so that a refrigeration system at an infrastructure layer performs centralized power supply and refrigeration in an area where the virtual machine that cannot be powered off is located.

Optionally, the IT device layer management system may determine a migrated object according to a current running state of each virtual machine, and acquire, by calculation according to a preset algorithm and the above migration rule, a path for hot migration of the migrated object, thereby acquiring the specific centralized deployment policy. Optionally, after determining the migrated object, the IT device layer management system may also calculate the degree of matching between the current running state of each virtual machine and preset several migration scenarios (each migration scenario is configured with a corresponding centralized deployment policy), thereby selecting one of preset several centralized deployment policies as a policy for performing hot migration currently. The manner of acquiring the centralized deployment policy may be determined according to an actual situation, and is not limited herein.

604. The information technology device layer management system sends a hot migration message to virtual machines requiring hot migration.

The information technology device layer management system sends the hot migration message to the virtual machines requiring hot migration, so that the virtual machines in the load state are deployed in a centralized manner.

605. The information technology device layer management system sends a power-off instruction to virtual machines in a no-load state.

After determining that the hot migration of the virtual machines is completed, the IT device layer management system sends the power-off instruction to the virtual machines in the no-load state according to the system resource occupation information after centralized deployment, and closes the virtual machines in the no-load state.

606. The information technology device layer management system sends a refrigeration adjustment instruction to an infrastructure layer monitoring system.

The sending, by the IT device layer management system, a refrigeration adjustment instruction to the infrastructure layer monitoring system according to the deployment information of the virtual machines after determining that the virtual machines in the no-load state are powered off specifically is:

if an area where the closed virtual machines are located is a no-load area, sending a first refrigeration adjustment instruction to the infrastructure layer monitoring system, so that the infrastructure layer monitoring system closes a refrigeration device in the no-load area, where the no-load area is an area where all virtual machines are in a power-off state; or if an area where the closed virtual machines are located is a light-load area, sending a second refrigeration adjustment instruction to the infrastructure layer monitoring system, so that the infrastructure layer monitoring system reduces a refrigeration effect in the light-load area, where the light-load area is an area where the number of virtual machines in a load state is smaller than a preset number (the preset number may be determined according to an actual situation and is not limited herein). Because a virtual machine still runs in the light-load area, the refrigeration device in the area cannot be closed;

in addition, because hot migration occurs in the area, and the number of virtual machines in the load state is small, the refrigeration effect of the area can be reduced.

Figure 7:
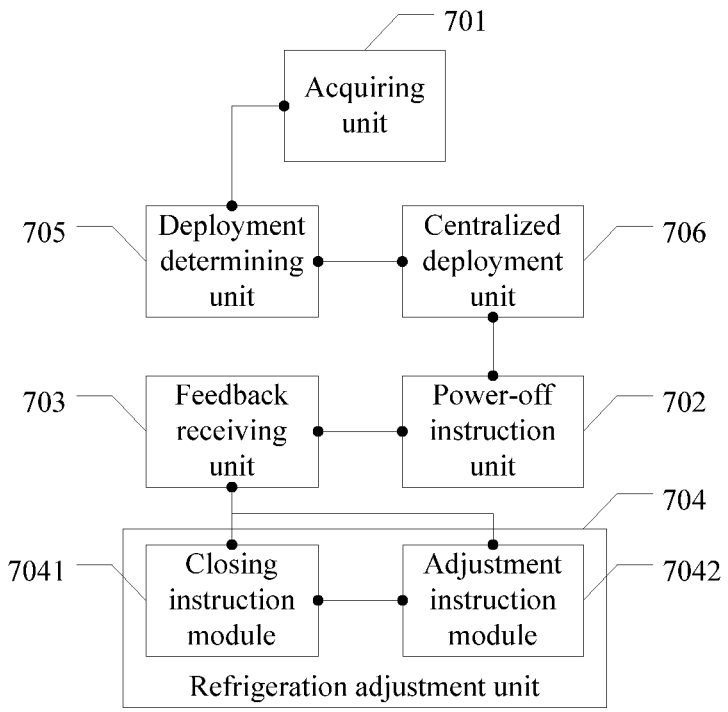
FIG. 7 is a schematic diagram of an embodiment of an energy saving monitoring apparatus according to the present invention.

The following describes an embodiment of an energy saving monitoring apparatus used to perform the above energy saving monitoring method according to the present invention. For the structure of the apparatus, refer to FIG. 7. An embodiment of the present invention provides an energy saving monitoring apparatus, including:

an acquiring unit 701 configured to acquire system resource occupation information of an IT device layer management system;

a power-off instruction unit 702 configured to send a power-off instruction to the IT device layer management system according to the system resource occupation information, so that the IT device layer management system closes a virtual machine in a no-load state; a feedback receiving unit 703 configured to receive a power-off feedback message sent by the IT device layer management system; and a refrigeration adjustment unit 704 configured to send a refrigeration adjustment instruction to an infrastructure layer monitoring system according to a running state of a corresponding virtual machine in a refrigeration area where the closed virtual machine is located, so that the infrastructure layer monitoring system adjusts refrigeration deployment of the refrigeration area where the closed virtual machine is located.

Optionally, the refrigeration adjustment unit 704 of the energy saving monitoring apparatus in the embodiment of the present invention may include: a closing instruction module 7041 configured to send a first refrigeration adjustment instruction to the infrastructure layer monitoring system if the refrigeration area where the closed virtual machine is located is a no-load area, so that the infrastructure layer monitoring system closes a refrigeration device in the no-load area, where the no-load area is an area where all virtual machines are in a power-off state; and an adjustment instruction module 7042 configured to send a second refrigeration adjustment instruction to the infrastructure layer monitoring system if the refrigeration area where the closed virtual machine is located is a light-load area, so that the infrastructure layer monitoring system reduces a refrigeration effect in the light-load area, where the light-load area is an area where the number of virtual machines in a load state is smaller than a preset number.

Optionally, the energy saving monitoring apparatus in the embodiment of the present invention may further include:

a deployment determining unit 705 configured to determine, according to the system resource occupation information, whether deployment of virtual machines needs to be changed, and if yes, trigger a centralized deployment unit 706; and the centralized deployment unit 706 configured to instruct, according to the system resource occupation information, the IT device layer management system to perform centralized deployment of the virtual machines in the load state, and trigger the power-off instruction unit 702 after the centralized deployment of the virtual machines in the load state is completed.

Then, in this scenario, the acquiring unit 701 is further configured to acquire system resource occupation information after the IT device layer management system performs the centralized deployment; and the power-off instruction unit 702 is further configured to send the power-off instruction to the IT device layer management system according to the system resource occupation information after the IT device layer management system performs the centralized deployment.

A specific interaction process of each unit in the energy saving monitoring apparatus in the embodiment of the present invention is as follows:

The acquiring unit 701 acquires the system resource occupation information of the IT device layer management system. Optionally, the energy saving monitoring apparatus may send a system resource query message to the IT device layer management system, and query the system resource occupation information of the IT device layer management system; the energy saving monitoring apparatus may also receive the system resource occupation information that is periodically pushed by the IT device layer management system.

Optionally, the system resource occupation information may be usage information and the like of a current operating system, process, thread, and application program of each virtual machine in the IT device layer management system. The energy saving monitoring apparatus analyzes the information to acquire CPU occupation information and/or memory occupation information of each virtual machine in the IT device layer management system.

Alternatively, the system resource occupation information may also be: CPU occupation information and/or memory occupation information of each virtual machine; after the IT device layer management system receives the system resource query message, the IT device layer management system performs an internal query about usage information and the like of a current operating system, process, thread, and application program of each virtual machine operating locally, thereby acquiring the CPU occupation information and/or memory occupation information of each virtual machine, and feeds back the CPU occupation information and/or memory occupation information to the energy saving monitoring apparatus through the system resource occupation information.

After the system resource occupation information is acquired, the power-off instruction unit 702 sends the power-off instruction to the IT device layer management system according to the system resource occupation information, so that the IT device layer management system closes the virtual machine in the no-load state.

Optionally, before the power-off instruction unit 702 performs an operation, the deployment determining unit 705 may determine, according to the system resource occupation information, whether the deployment of the virtual machines needs to be changed, and if yes, triggers the centralized deployment unit 706, or if not, keeps a state of each virtual machine in the IT device layer management system unchanged and terminates the procedure.

After receiving the system resource occupation information, the energy saving monitoring apparatus may determine the running state of each virtual machine in the IT device layer management system according to the system resource occupation information, and when a ratio of the number of virtual machines in the no-load state to the number of virtual machines in the load state meets a preset condition, determine that the deployment of the virtual machines needs to be changed. The load state may further include a light-load state and a heavy-load state. When considering whether hot migration needs to be performed, the energy saving monitoring apparatus may further consider the ratio of numbers of virtual machines in the no-load state, the light-load state, and the heavy-load state. A specific reference condition for determining whether the deployment of the virtual machines needs to be changed may be determined according to actual requirements, and is not limited herein. Whether the virtual machines are in the light-load state or heavy-load state may be determined by setting a preset load threshold, for example, virtual machines whose loads are higher than or equal to 50% are in the heavy-load state, and virtual machines whose loads are lower than 50% are in the light-load state.

The centralized deployment unit 706 instructs, according to the system resource occupation information, the IT device layer management system to perform the centralized deployment of the virtual machines in the load state, and triggers the power-off instruction unit 702 after the centralized deployment of the virtual machines in the load state is completed. Specifically, the centralized deployment unit 706 may send a hot migration instruction carrying a centralized deployment policy to the IT device layer management system, instructing the IT device layer management system to perform the centralized deployment. After determining that the deployment of virtual machines needs to be changed, the centralized deployment unit 706 may determine, according to the system resource occupation information, virtual machines requiring centralized deployment, and further, may determine the centralized deployment policy according to the virtual machines requiring centralized deployment. In this embodiment, the centralized deployment of the virtual machines may be implemented by hot migration of the virtual machines. Hot migration of a virtual machine means that a running state of a whole virtual machine is completely stored and can be quickly restored on another virtual machine of an original hardware platform or a virtual machine of a different hardware platform; in addition, in the restoration process, the virtual machine can implement smooth service migration without interruption, so that a user does not perceive any difference. Specifically, the centralized deployment policy may include a migrated object and a migration rule. The migration rule in the centralized deployment policy may be: most preferentially hot-migrating a server device to an area close to a management device; next, hot-migrating the server device to an area close to a storage device; and still next, hot-migrating the server device to an area close to a network device.

After the IT device layer management system closes the virtual machine in the no-load state, the feedback receiving unit 703 may receive the power-off feedback message sent by the IT device layer management system; subsequently, the refrigeration adjustment unit 704 may be triggered to send the refrigeration adjustment instruction to the infrastructure layer monitoring system according to the running state of the corresponding virtual machine in the refrigeration area where the closed virtual machine is located, so that the infrastructure layer monitoring system adjusts refrigeration deployment of the refrigeration area where the closed virtual machine is located.

Optionally, the closing instruction module 7041 sends the first refrigeration adjustment instruction to the infrastructure layer monitoring system if the refrigeration area where the closed virtual machine is located is a no-load area, so that the infrastructure layer monitoring system closes the refrigeration device in the no-load area, where the no-load area is the area where all the virtual machines in the area are in the power-off state; and the adjustment instruction module 7042 sends the second refrigeration adjustment instruction to the infrastructure layer monitoring system if the refrigeration area where the closed virtual machine is located is a light-load area, so that the infrastructure layer monitoring system reduces the refrigeration effect in the light-load area, where the light-load area is the area where the number of virtual machines in the load state is smaller than the preset number.

Figure 8:
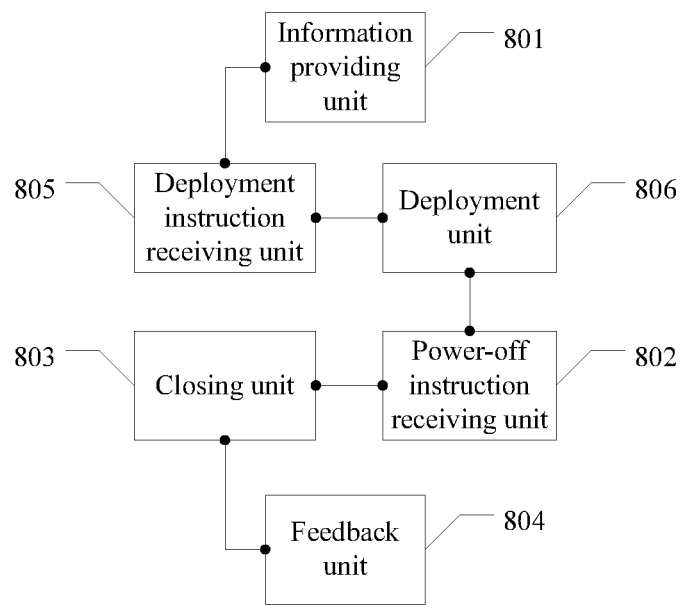
FIG. 8 is a schematic diagram of an embodiment of an IT device layer management system according to the present invention.

The following describes an embodiment of an IT device layer management system used to perform the above energy saving monitoring method according to the present invention. For the structure of the system, refer to FIG. 8. An embodiment of an IT device layer management system in the embodiments of the present invention includes: an information providing unit 801 configured to provide an energy saving monitoring apparatus with system resource occupation information of the IT device layer management system; a power-off instruction receiving unit 802 configured to receive a power-off instruction sent according to the system resource occupation information by the energy saving monitoring apparatus; a closing unit 803 configured to close a virtual machine in a no-load state according to the power-off instruction; and a feedback unit 804 configured to send a power-off feedback message to the energy saving monitoring apparatus, so that the energy saving monitoring apparatus sends a refrigeration adjustment instruction to an infrastructure layer monitoring system according to a running state of a corresponding virtual machine in a refrigeration area where the closed virtual machine is located.

Optionally, the IT device layer management system in the embodiment of the present invention may further include: a deployment instruction receiving unit 805 configured to receive an instruction sent by the energy saving monitoring apparatus, for centralized deployment of virtual machines in a load state; and a deployment unit 806 configured to perform the centralized deployment of the virtual machines in the load state according to the instruction.

In this scenario, the information providing unit 801 is further configured to provide the energy saving monitoring apparatus with system resource occupation information after the IT device layer management system performs the centralized deployment; and the power-off instruction receiving unit 802 is further configured to receive the power-off instruction sent according to the system resource occupation information by the energy saving monitoring apparatus after the centralized deployment.

A specific operation process of each unit in the IT device layer management system in the embodiment of the present invention is as follows:

The information providing unit 801 provides the energy saving monitoring apparatus with the system resource occupation information of the IT device layer management system; optionally, the information providing unit 801 may periodically and actively push the system resource occupation information of the IT device layer management system to the energy saving monitoring apparatus, or may also carry the system resource occupation information in a response after receiving a system resource query message.

After the energy saving monitoring apparatus is provided with the system resource occupation information of the IT device layer management system, the power-off instruction receiving unit 802 may receive the power-off instruction sent according to the system resource occupation information by the energy saving monitoring apparatus; and the closing unit 803 may close the virtual machine in the no-load state according to the power-off instruction.

Optionally, in actual applications, if the IT device layer management system needs to perform the centralized deployment of the virtual machines in the load state, before the power-off instruction is received, the deployment instruction receiving unit 805 may receive an instruction sent by the energy saving monitoring apparatus, for the centralized deployment of the virtual machines in the load state; specifically, the deployment instruction receiving unit 805 may receive a hot migration instruction, where the hot migration instruction may include a centralized deployment policy, so that the IT device layer management system is instructed to perform centralized deployment, and the deployment unit 806 hot-migrates the virtual machines in the IT device layer management system according to the hot migration instruction, thereby implementing the centralized deployment of the virtual machines in the load state. Specifically, the manner of the centralized deployment of the virtual machines is decided by the centralized deployment policy, where many types of hot migration rules may be used to implement the centralized deployment of the virtual machines. The centralized deployment policy may include a migrated object (that is, a virtual machine requiring hot migration) and a migration rule. The migration rule in the centralized deployment policy may be: most preferentially hot-migrating a server device to an area close to a management device; next, hot-migrating the server device to an area close to a storage device; and still next, hot-migrating the server device to an area close to a network device.

After it is determined that the hot migration is completed, a hot migration completion response may be returned to the energy saving monitoring apparatus, so that the energy saving monitoring apparatus may perform a further operation.

After a power-off instruction is received, the closing unit 803 closes the virtual machine in the no-load state according to the power-off instruction; after closing of the virtual machine in the no-load state is completed, the feedback unit 804 sends the power-off feedback message to the energy saving monitoring apparatus, so that the energy saving monitoring apparatus sends the refrigeration adjustment instruction to the infrastructure layer monitoring system according to the running state of the corresponding virtual machine in the refrigeration area where the closed virtual machine is located. Therefore, the energy saving monitoring apparatus sends the refrigeration adjustment instruction to the infrastructure layer monitoring system according to the power-off feedback message to adjust refrigeration deployment.

In the several embodiments provided in the present application, it should be understood that, the disclosed apparatus and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and the parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in a form of a software product. The computer software product is stored in a storage medium and includes several instructions for instructing a computer device (which may be a personal computer, a server, a network device, or the like) to perform all or a part of the steps of the methods described in the embodiments of the present invention. The foregoing storage medium includes: any medium that can store program codes, such as a universal serial bus (USB) flash disk, a removable hard disk, a read-only memory (ROM), a random access memory (RAM), a magnetic disk, or an optical disk.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An energy saving monitoring method, performed by a monitoring apparatus in communication with an information technology (IT) device layer management system and an infrastructure layer monitoring system, wherein the IT device layer management system manages multiple virtual machines distributed in different areas, and the multiple virtual machines include at least one server-type virtual machine whose running state is a loaded state and at least one server-type virtual machine whose running state is a no-load state, and wherein the at least one server-type virtual machine in the loaded state is deployed in a resource server in a first area; and the method comprising:

acquiring system resource occupation information from the IT device layer management system, wherein the system resource occupation information indicates the running state of each virtual machine;

determining, according to the system resource occupation information, whether the distribution of the virtual machines needs to be changed;

based on a determination that the distribution of the virtual machines needs to be changed, sending the IT device layer management system a hot migration instruction, wherein the hot migration instruction instructs the IT device layer management system to hot-migrate the at least one server-type virtual machine in the loaded state from the resource server in the first area to another device in a different area according to a centralized deployment policy; and sending the IT device layer management system a power-off instruction, wherein the power-off instruction instructs the IT device layer management system to power off the at least one server-type virtual machine in the no-load state;

wherein the centralized deployment policy comprises: hot-migrating the server-type virtual machine in the loaded state from the resource server in the first area, most preferentially to a resource server in a second area close to a management device, second most preferentially to a resource server in a third area close to a storage device, and third most preferentially to a resource server in a fourth area close to a network device, and wherein the management device, the storage device and the network device are not powered off.

2. The method according to claim 1, further comprising:

receiving a power-off feedback message from the IT device layer management system indicating that the at least one server-type virtual machine in the no-load state is powered off; and sending an air conditioning adjustment instruction to the infrastructure layer monitoring system, wherein the air conditioning adjustment instruction instructs the infrastructure layer monitoring system to adjust an air conditioning level of an area where the server-type virtual machine in the no-load state is powered off.

3. The method according to claim 2, wherein sending the air conditioning adjustment instruction to the infrastructure layer monitoring system comprises:

when the area where the server-type virtual machine in the no-load state is powered off is a no-load area, sending a first air conditioning adjustment instruction to the infrastructure layer monitoring system, wherein the first air conditioning adjustment instruction instructs the infrastructure layer monitoring system to power off cooling equipment in the no-load area, wherein the no-load area is an area where all virtual machines are in the no-load state and are powered off.

4. The method according to claim 2, wherein sending the air conditioning adjustment instruction to the infrastructure layer monitoring system comprises:

when the area where the server-type virtual machine in the no-load state is powered off is a light-load area, sending a second air conditioning adjustment instruction to the infrastructure layer monitoring system, wherein the second air conditioning adjustment instruction instructs the infrastructure layer monitoring system to reduce the air conditioning level in the light-load area, wherein the light-load area is an area where the number of the virtual machines in a loaded state is smaller than a preset number.

5. The method according to claim 1, wherein the system resource occupation information comprises either one or both of central processing unit (CPU) occupation information and memory occupation information of the virtual machines, and wherein determining, according to the system resource occupation information, whether the distribution of the virtual machines needs to be changed comprises:

determining, according to either one or both of the CPU occupation information and memory occupation information, a quantity of the virtual machines in the no-load state and a quantity of the virtual machines in the loaded state; and determining that the distribution of the virtual machines needs to be changed when a ratio of the virtual machines in the no-load state and the virtual machines in the loaded state meets a preset condition.

6. The method according to claim 5, wherein determining, according to either one or both of the CPU occupation information and the memory occupation information, the quantity of the virtual machines in the no-load state comprises:

preliminarily determining that the virtual machines are in the no-load state when the CPU occupation information, the memory occupation information, or both the occupation information and the memory occupation information meet a preset no-load condition;

reacquiring the CPU occupation information, the memory occupation information of the virtual machines, or both the occupation information and the memory occupation information after a preset duration; and determining that the virtual machines are in the no-load state when the reacquired CPU occupation information, the reacquired memory occupation information, or both still meet the preset no-load condition, and counting the number of the virtual machines in the no-load state.

7. The method according to claim 5, wherein determining, according to either one or both of the CPU occupation information and the memory occupation information, the quantity of the virtual machines in the loaded state comprises:

preliminarily determining that the virtual machines are in the loaded state when the CPU occupation information, the memory occupation information, or both the CPU occupation information and the memory occupation information meet a preset load condition;

reacquiring the CPU occupation information, the memory occupation information, or both the CPU occupation information and the memory occupation information after a preset duration; and determining that the virtual machines are in the loaded state when the reacquired CPU occupation information, the reacquired memory occupation information, or both the reacquired CPU occupation information and the reacquired memory occupation information still meet the preset load condition, and counting the number of the virtual machines in the loaded state.

8. The method according to claim 1, wherein sending the IT device layer management system the power-off instruction comprises:

reacquiring the system resource occupation information, wherein the reacquired system resource occupation information indicates the running state of each virtual machine after the server-type virtual machine in the loaded state is hot-migrated; and sending the power-off instruction according to the reacquired system resource occupation information.

9. An energy saving monitoring method, performed by an information technology (IT) device layer management system in communication with an monitoring apparatus, wherein the IT device layer management system manages multiple virtual machines distributed in different areas, and the multiple virtual machines include at least one server-type virtual machine whose running state is a loaded state and at least one server-type virtual machine whose running state is a no-load state, and wherein the at least one server-type virtual machine in the loaded state is deployed in a resource server in a first area; and the method comprising:

providing the monitoring apparatus with a system resource occupation information of the virtual machines;

after receiving a hot migration instruction from the monitoring apparatus, hot-migrating the at least one server-type virtual machine in the loaded state from the resource server in the first area to another device in a different area according to a centralized deployment policy; and after receiving a power-off instruction from the monitoring apparatus, powering off the server-type virtual machine in the no-load state according to the power-off instruction;

wherein the centralized deployment policy comprises: hot-migrating the server-type virtual machine in the load state, from the resource server in the first area, most preferentially to a resource server in a second area close to a management device, second most preferentially to a resource server in a third area close to the storage device, and third most preferentially to a resource server in a fourth area close to the network device, and wherein the management device, the storage device and the network device are not powered off.

10. The method according to claim 9, further comprising:
after powering off the at least one server-type virtual machine in the no-load state, sending a power-off feedback message to the monitoring apparatus indicating that the server-type virtual machine in the no-load state is powered off, wherein after receiving the power-off feedback message, the monitoring apparatus sends an air conditioning adjustment instruction to an infrastructure layer monitoring system, the infrastructure layer monitoring system adjusts an air conditioning level of an area where the powered-off server-type virtual machine is located according to the air conditioning adjustment instruction.

11. The method according to claim 9, wherein the centralized deployment policy is carried in the hot migration instruction.

12. An monitoring apparatus in communication with an information technology (IT) device layer management system and an infrastructure layer monitoring system, wherein the IT device layer management system manages multiple virtual machines distributed in different areas, and the multiple virtual machines include at least one server-type virtual machine whose running state is a loaded state and at least one server-type virtual machine whose running state is a no-load state, and wherein the at least one server-type virtual machine in the loaded state is deployed in a resource server in a first area; the monitoring apparatus comprises:

a processor; and a non-transitory computer readable medium which stores computer-executable instructions, wherein the processor is configured to execute the computer-executable instructions to perform operations comprising:

acquiring system resource occupation information from the IT device layer management system, wherein the system resource occupation information indicates the running state of each virtual machine;

determining, according to the system resource occupation information, whether the distribution of the virtual machines needs to be changed;

based on a determination that the distribution of the virtual machines needs to be changed, sending the IT device layer management system a hot migration instruction, wherein the hot migration instruction instructs the IT device layer management system to hot-migrate the at least one server-type virtual machine in the loaded state from the resource server in the first area to another device in a different area according to a centralized deployment policy; and sending the IT device layer management system a power-off instruction, wherein the power-off instruction instructs the IT device layer management system to power off the at least one server-type virtual machine in the no-load state;

wherein the centralized deployment policy comprises: hot-migrating the server-type virtual machine in the loaded state from the resource server in the first area, most preferentially to a resource server in a second area close to a management device, second most preferentially to a resource server in a third area close to a storage device, and third most preferentially to a resource server in a fourth area close to a network device, and wherein the management device, the storage device and the network device are not powered off.

13. The apparatus according to claim 12, wherein the processor is configured to execute the computer-executable instructions to perform a further operation comprising:

receiving a power-off feedback message from the IT device layer management system indicating that the at least one server-type virtual machine in the no-load state is powered off; and sending an air conditioning adjustment instruction to the infrastructure layer monitoring system, wherein the air conditioning adjustment instruction instructs the infrastructure layer monitoring system to adjust an air conditioning level of an area where the server-type virtual machine in the no-load state is powered off.

14. The apparatus according to claim 13, wherein sending the air conditioning adjustment instruction to the infrastructure layer monitoring system comprises:

when the area where the server-type virtual machine in the no-load state is powered off is a no-load area, sending a first air conditioning adjustment instruction to the infrastructure layer monitoring system, wherein the first air conditioning adjustment instruction instructs the infrastructure layer monitoring system to power off cooling equipment in the no-load area, wherein the no-load area is an area where all virtual machines are in the no-load state and are powered off.

15. The apparatus according to claim 13, wherein sending the air conditioning adjustment instruction to the infrastructure layer monitoring system comprises:

when the area where the server-type virtual machine in the no-load state is powered off is a light-load area, sending a second air conditioning adjustment instruction to the infrastructure layer monitoring system, wherein the second air conditioning adjustment instruction instructs the infrastructure layer monitoring system to reduce the air conditioning level in the light-load area, wherein the light-load area is an area where the number of the virtual machines in a loaded state is smaller than a preset number.

16. The apparatus according to claim 12, wherein the system resource occupation information comprises either one or both of central processing unit (CPU) occupation information and memory occupation information of the virtual machines, and wherein determining, according to the system resource occupation information, whether the distribution of the virtual machines needs to be changed comprises:

determining, according to either one or both of the CPU occupation information and memory occupation information, a quantity of the virtual machines in the no-load state and a quantity of the virtual machines in the loaded state; and determining that the distribution of the virtual machines needs to be changed when a ratio of the virtual machines in the no-load state and the virtual machines in the loaded state meets a preset condition.

17. The apparatus according to claim 16, wherein determining, according to either one or both of the CPU occupation information and the memory occupation information, the quantity of the virtual machines in the no-load state comprises:

preliminarily determining that the virtual machines are in the no-load state when the CPU occupation information, the memory occupation information, or both the occupation information and the memory occupation information meet a preset no-load condition;

reacquiring the CPU occupation information, the memory occupation information of the virtual machines, or both the occupation information and the memory occupation information after a preset duration; and determining that the virtual machines are in the no-load state when the reacquired CPU occupation information, the reacquired memory occupation information, or both still meet the preset no-load condition, and counting the number of the virtual machines in the no-load state.

18. The apparatus according to claim 16, wherein determining, according to either one or both of the CPU occupation information and the memory occupation information, the quantity of the virtual machines in the loaded state comprises:

preliminarily determining that the virtual machines are in the loaded state when the CPU occupation information, the memory occupation information, or both the CPU occupation information and the memory occupation information meet a preset load condition;

reacquiring the CPU occupation information, the memory occupation information, or both the CPU occupation information and the memory occupation information after a preset duration; and determining that the virtual machines are in the loaded state when the reacquired CPU occupation information, the reacquired memory occupation information, or both the reacquired CPU occupation information and the reacquired memory occupation information still meet the preset load condition, and counting the number of the virtual machines in the loaded state.

19. The apparatus according to claim 13, wherein sending the IT device layer management system the power-off instruction comprises:

reacquiring the system resource occupation information, wherein the reacquired system resource occupation information indicates the running state of each virtual machine after the server-type virtual machine in the loaded state is hot-migrated; and sending the power-off instruction according to the reacquired system resource occupation information.

20. An information technology (IT) device layer management system in communication with a monitoring apparatus, wherein the IT device layer management system manages multiple virtual machines distributed in different areas, and the multiple virtual machines include at least one server-type virtual machine whose running state is a loaded state and at least one server-type virtual machine whose running state is a no-load state, and wherein the at least one server-type virtual machine in the loaded state is deployed in a resource server in a first area; and the IT device layer management system comprising:

a processor; and a non-transitory computer readable medium which contains computer-executable instructions, the processor is configured to execute the computer-executable instructions to perform operations comprising:

providing the monitoring apparatus with a system resource occupation information of the virtual machines;

after receiving a hot migration instruction from the monitoring apparatus, hot-migrating the at least one server-type virtual machine in the loaded state from the resource server in the first area to another device in a different area according to a centralized deployment policy; and after receiving a power-off instruction from the monitoring apparatus, powering off the server-type virtual machine in the no-load state according to the power-off instruction;

wherein the centralized deployment policy comprises: hot-migrating the server-type virtual machine in the load state, from the resource server in the first area, most preferentially to a resource server in a second area close to a management device, second most preferentially to a resource server in a third area close to the storage device, and third most preferentially to a resource server in a fourth area close to the network device, and wherein the management device, the storage device and the network device are not powered off.

21. The IT device layer management system according to claim 20, wherein the processor is configured to execute the computer-executable instructions to perform a further operation comprising:

after powering off the at least one server-type virtual machine in the no-load state, sending a power-off feedback message to the monitoring apparatus indicating that the server-type virtual machine in the no-load state is powered off, wherein after receiving the power-off feedback message, the monitoring apparatus sends an air conditioning adjustment instruction to an infrastructure layer monitoring system, the infrastructure layer monitoring system adjusts an air conditioning level of an area where the powered-off server-type virtual machine is located according to the air conditioning adjustment instruction.

22. The IT device layer management system according to claim 20, wherein the centralized deployment policy is carried in the hot migration instruction.

\* \* \* \* \*